United States Patent [19]

Yoon

[11] Patent Number: 4,562,244

[45] Date of Patent: Dec. 31, 1985

[54] PROCESS FOR FORMING THERMALLY STABLE THERMOTROPIC LIQUID CRYSTALLINE POLYESTERS OF PREDETERMINED CHAIN LENGTH UTILIZING ALIPHATIC DICARBOXYLIC ACID

[75] Inventor: Hyun-Nam Yoon, Summit, N.J.

[73] Assignee: Celanese Corporation, New York, N.Y.

[21] Appl. No.: 595,004

[22] Filed: Mar. 29, 1984

[51] Int. Cl.$^4$ .................. C08G 63/06; C08G 63/16; C08G 63/60; C08G 69/44

[52] U.S. Cl. .................................. 528/190; 528/172; 528/173; 528/176; 528/184; 528/193; 528/194; 528/206; 528/208; 528/271

[58] Field of Search ............... 528/184, 172, 173, 190, 528/193, 194, 206, 208, 271, 176

[56] References Cited

U.S. PATENT DOCUMENTS

| | | | |
|---|---|---|---|
| 4,248,995 | 2/1981 | Fayolle | 528/194 |
| 4,390,681 | 6/1983 | Deex | 528/194 |
| 4,398,019 | 8/1983 | Cox et al. | 528/194 |
| 4,474,938 | 10/1984 | Richardson | 528/194 |

*Primary Examiner*—Lester L. Lee
*Attorney, Agent, or Firm*—Burns, Doan, Swecker & Mathis

[57] ABSTRACT

An improved polymerization process is provided for the formation of a polyester which is capable of forming an anisotropic melt phase and which optionally may include amide linkages. An approximately 0.25 to 4 percent molar excess of aliphatic dicarboxylic acid monomer containing 4 to 12 carbon atoms (e.g. azelaic acid) and/or an esterified derivative thereof is provided in the polymerization zone during the polymerization reaction. Such monomer imparts dicarboxyaliphatic units to the interior of the resulting polymer chains and causes the polymer chains to terminate in carboxylic acid end groups and/or an esterified derivative thereof wherein the polymer chains achieve a predetermined average chain length through the depletion of other monomers present in the polymerization zone. The resulting polyester unlike the usual product of the prior art is substantially incapable of additional chain growth upon subsequent heating and accordingly may be relied upon to maintain a substantially constant viscosity during melt processing regardless of the duration of heating.

30 Claims, No Drawings

PROCESS FOR FORMING THERMALLY STABLE THERMOTROPIC LIQUID CRYSTALLINE POLYESTERS OF PREDETERMINED CHAIN LENGTH UTILIZING ALIPHATIC DICARBOXYLIC ACID

BACKGROUND OF THE INVENTION

It has been disclosed that certain polyesters may be formed which exhibit melt anisotropy. Such polymers commonly are referred to as being thermotropic liquid crystalline polymers. See, for instance, (a) *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics Composites Institute, The Society of the Plastics Industry, Inc., Section 17-D, Pages 1-4; (b) Belgian Pat. Nos. 828,935 and 828,936; (c) Dutch Pat. No. 7505551; (d) West German Nos. 2520819, 2520820, 2722120, 2834535, 2834536 and 2834537; (e) Japanese Nos. 43-223; 2132-116; 3017-692; and 3021-293; (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265;802; 4,267,304; 4,269,965; 4,272,625; 4,279,803; 4,284,757; 4,285,852; 4,287,332; 4,294,955; 4,299,756; 4,311,824; 4,314,073; 4,318,841; 4,318,842; 4,330,457; 4,332,759; 4,333,907; 4,335,232; 4,337,190; 4,337,191; 4,339,375; 4,341,688; 4,346,208; 4,347,349; 4,351,917; 4,351,918; 4,355,132; 4,355,133; 4,355,134; 4,359,569; 4,360,658; 4,362,777; 4,370,466; 4,371,660; 4,374,288; 4,375,530; 4,381,389; 4,384,016; 4,393,191; 4,394,498; 4,395,307; 4,395,536; 4,408,022; 4,421,908; 4,429,060; 4,429,061; 4,429,100; 4,429,105; 4,431,770; and 4,434,262; (g) U.K. application No. 2,002,404; (h) British Pat. No. 1,568,541; and (i) European patent application Nos. 24,499 and 45,499. Amide groups and/or carbonate groups additionally may be present in the polyesters which exhibit melt anisotropy.

The thermotropic liquid crystalline polymers of the prior art are formed by techniques whereby the requisite reactive groups which form ester-groups along the polymer chain are carefully reacted so as to provide a stoichiometric balance of reactive groups. For instance, if a relatively volatile monomer, such as hydroquinone or hydroquinone diacetate, is employed as a reactant, an excess of this monomer sometimes is provided to compensate for the quantity of this reactant which is evolved and lost by volatilization through the use of the specific polymerization conditions selected. When the various ester-forming monomers are provided and react with each other under stoichiometrically balanced conditions, a polymer is produced having the random presence of the requisite ester-forming groups at the ends of the polymer chain. These end groups unless otherwise end capped in a further reaction step have the propensity upon subsequent thermal processing to react with each other and to cause the polymer chains to continue to grow in length. The thermal processing of such polymers to increase the molecular weight in the solid state is disclosed, for example, in U.S. Pat. Nos. 3,975,487; 4,183,895; 4,247,514; and 4,424,184. The continued polymerization via a condensation reaction results in the simultaneous evolution or off-gassing of relatively small molecular by-products and an elevation in the melt viscosity of the resulting polymer upon any subsequent melt processing. Such increase in melt viscosity may require the selection of different melt processing conditions at different points in time as the average chain length increases. For instance, it may be desirable to modify the injection molding conditions when forming molded articles from the resulting anisotropic melt-forming polyester. Accordingly, the melt processing of such polymers may require the continued or periodic monitoring of the molten polymer viscosity and the adjustment of melt processing conditions in an effort to yield uniform molded products if the molten polymer is provided at an elevated temperature for an extended period of time.

Additionally, the melt devolatilization of previously formed thermotropic liquid crystalline polymers of the prior art is desirable to remove substantial quantities of void-forming volatile materials contained therein. However, if such devolatilization is practiced for a sufficient period of time to substantially remove such volatiles, a continued molecular weight increase also will occur.

It is an object of the present invention to provide an improved process for forming a thermally stable thermotropic liquid crystalline polyester of predetermined chain length.

It is an object of the present invention to provide an improved process for forming a thermally stable thermotropic liquid crystalline polyester which is particularly suited for melt processing to form substantially uniform molded articles on a consistent basis.

It is an object of the present invention to provide an improved process for forming a thermotropic liquid crystalline polymer which will generate a significantly reduced amount of volatile by-products during further melt processing.

It is an object of the present invention to provide an improved process for forming a thermotropic liquid crystalline polymer which is capable of undergoing vigorous melt devolatilization without concomitantly producing an excessive polymer chain growth and a significant change in the melt viscosity of the resulting polymer.

It is an object of the present invention to provide a thermally stable polyester which is capable of forming a liquid crystalline melt phase without the need of employing a conventional end-capping reaction of a previously formed polymer.

These and other objects, as well as the scope, nature and utilization of the invention will be apparent to those skilled in the art from the following detailed description.

In my commonly assigned U.S. patent application Ser. No. 517,865, filed July 23, 1983 entitled "Improved Process for Forming Thermally Stable Thermotropic Liquid Crystalline Polyesters of Predetermined Chain Length" is disclosed an alternate route for accomplishing the same objects of the present invention.

SUMMARY OF THE INVENTION

It has been found that in a process for the formation within a polymerization zone of a polyester which is capable of forming an anisotropic melt phase and which optionally may include amide linkages through a polymerization reaction of ester-forming and optionally also amide-forming monomers to form a polymer having recurring moieties selected from the group consisting of the following where in each instance Ar comprises at least one aromatic ring:

(a)

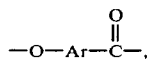

(b) —O—Ar—O—, (c)

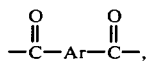

(d) —Y—Ar—Z—, where Y is O, NH, or NR, and Z is NH or NR where R is an alkyl group of 1 to 6 carbon atoms or an aryl group, (e)

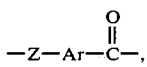

where Z is NH or NR where R is an alkyl group of 1 to 6 carbon atoms or an aryl group, and (f) mixtures of the foregoing;

that improved results are achieved by providing in the polymerization zone during the polymerization reaction an approximately 0.25 to 4 percent molar excess of aliphatic dicarboxylic acid monomer containing 4 to 12 carbon atoms and/or an esterified derivative thereof which during the polymerization reaction imparts dicarboxyaliphatic units to the interior of the polymer chains of the resulting polymer and causes the polymer chains to terminate in carboxylic acid end groups and/or an esterified derivative thereof wherein the polymer chains achieve a predetermined average chain length through the depletion of other monomers present in the polymerization zone to yield a polyester product which is substantially incapable of additional chain growth upon subsequent heating.

A polyester formed in accordance with the process of the invention is provided which is capable of forming an anisotropic melt phase, is substantially incapable of further chain growth upon heating, and possesses polymer chains which terminate substantially exclusively in carboxylic acid end groups and/or an esterified derivative thereof.

DESCRIPTION OF PREFERRED EMBODIMENTS

As is known in polymer technology, a thermotropic liquid crystalline polymer exhibits optical anisotropy in the melt. The anisotropic character of the polymer melt may be confirmed by conventional polarized light techniques whereby crossed-polarizers are utilized. More specifically, the anisotropic nature of the melt phase may conveniently be confirmed by the use of a Leitz polarizing microscope at a magnification of 40X with the sample on a Leitz hot stage and under a nitrogen atmosphere. The amount of light transmitted changes when the sample is forced to flow; however, the sample is optionally anisotropic even in the static state. On the contrary typical melt processable polymers do not transmit light to any substantial degree when examined under quiescent conditions and are isotropic in nature.

The thermotropic liquid crystalline polyester which is formed by the process of the present invention, as described hereafter, is unlike the polymerization products of the prior art and is substantially incapable of further chain growth upon heating at its melt processing temperature. It possesses polymer chains which terminate substantially exclusively in carboxylic acid end groups and/or an esterified derivative thereof without the use in its formation of an end-capping reaction of a previously formed polymer through the introduction of an end-capping reactant to the polymerization zone at the conclusion of the polymerization. The polymer chains terminate in functional groups which are substantially incapable of a further polymerization reaction between the adjoining polymer chains. When such polymer is heated in an inert atmosphere (e.g. nitrogen or argon) for 30 minutes while at a temperature of 340° C., its weight average molecular weight preferably increases no more than 15 percent.

Any of the polyester-forming monomers which are capable of forming a polyester which exhibits an optically anisotropic melt phase may be employed in the improved process of the present invention. Amide-forming monomers optionally may additionally be present whereby a poly(ester-amide) is formed which exhibits an optically anisotropic melt phase. Minor quantities of carbonate-forming monomers may be included provided they do not adversely influence the ability of the resulting polyester to exhibit an optically anisotropic melt phase. In a preferred embodiment the resulting polymer is wholly aromatic with the exception of moieties derived from the molar excess of aliphatic dicarboxylic acid (described hereafter) in the sense that each moiety present therein contributes at least one aromatic ring.

A possible monomer for selection when forming the polyester in accordance with the process of the present invention is one which imparts

recurring moieties to the polymer chain where Ar comprises at least one aromatic ring. In a preferred embodiment Ar is 1,4-phenylene or 2,6-naphthalene. Accordingly the moiety is a 4-oxybenzoyl moiety or a 6-oxy-2-naphthoyl moiety in such instances. The polyester may include a plurality of different recurring moieties where Ar is different in each and where each moiety satisfies the above general formula, such as a combination of 1,4-phenylene and 2,6-naphthalene. Such monomers are inherently stoichiometrically balanced since they contain precisely the correct quantity of ester-forming reactant groups. The aromatic ring or rings present optionally may include substitution of at least some of the hydrogen atoms present thereon. Such substitution may be selected from an alkyl group of 1 to 4 carbon atoms, an alkoxy group of 1 to 4 carbon atoms, halogen (e.g. Cl, Br, I), phenyl, and mixtures of the foregoing. Particularly preferred moieties may be derived from 4-hydroxybenzoic acid and 6-hydroxy-2-naphthoic acid. Representative ring substituted moieties include 2-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 3-phenyl-4-hydroxybenzoic acid, 2-phenyl-4-hydroxybenzoic acid, 6-hydroxy-5-chloro-2-naphthoic acid, 6-hydroxy-5-methyl-2-naphthoic acid, 6-hydroxy-5-methoxy-2-naphthoic acid, 6-hydroxy-4,7-dichloro-2-chloro-2-naphthoic acid, etc. Other non-ring substituted moieties may be derived from 3-hydroxybenzoic acid and 4-hydroxybiphenyl-4'-carboxylic acid.

A possible monomer for selection when forming the polyester in accordance with the process of the present invention is one which imparts

recurring moieties to the polymer chain where Ar comprises at least one aromatic ring. Representative moieties include:

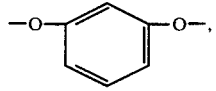

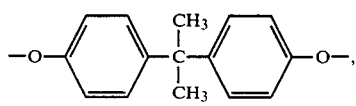

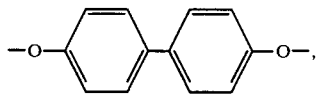

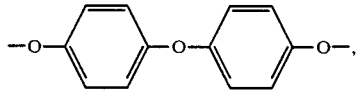

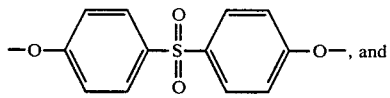

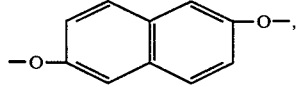

In a preferred embodiment Ar is 1,4-phenylene, 2,6-naphthalene, or 4,4'-biphenyl. The polyester may include a plurality of different recurring moieties where Ar is different in each and where each moiety satisfies the above general formula. The aromatic ring or rings present optionally may include substitution of at least some of the hydrogen atoms present thereon as discussed in connection with the first described moiety. Examples of moieties which include ring substitution are those derived from phenylhydroquinone, methylhydroquinone, and chlorohydroquinone. Particularly preferred moieties may be simply derived from hydroquinone, 2,6-dihydroxynaphthalene, and 4,4'-biphenol.

A possible monomer for selection when forming the polyester in accordance with the process of the present invention is one which imparts

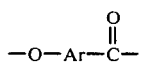

recurring moieties to the polymer chain where Ar comprises at least one aromatic ring. Representative moieties include:

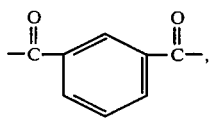

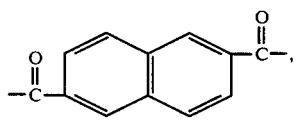

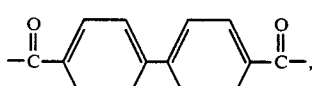

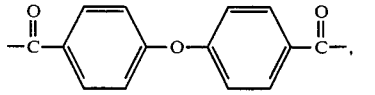

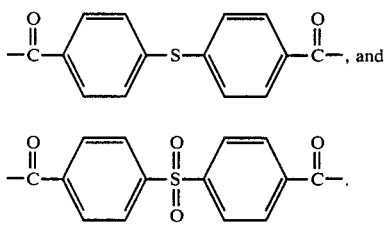

In a preferred embodiment Ar is 1,4-phenylene or 2,6-naphthalene. The polyester may include a plurality of different recurring moieties where Ar is different in each and where each moiety satisfies the above general formula. The aromatic ring or rings present optionally may include substitution of at least some of the hydrogen atoms present thereon as discussed in connection with the first described moiety. An example of a moiety which includes ring substitution is that derived from phenyl-substituted terephthalic acid. Particularly preferred moieties may be simply derived from terephthalic acid and 2,6-naphthalenedicarboxylic acid.

A possible monomer for selection when forming a polyester in accordance with the process of the present invention is one which imparts

recurring moieties to the polymer chain where Ar comprises at least one aromatic ring and where Y is O, NH, or NR, and Z is NH or NR where R is an alkyl group of 1 to 6 carbon atoms or an aryl group. R is preferably a straight chain alkyl group of 1 to 6 carbon atoms and is more preferably a methyl group. This monomer will impart amide linkages to the polymer chain. In a preferred embodiment Ar is 1,4-phenylene. The polyester may include a plurality of different recurring moieties where Ar is different in each and where each satisfies the above general formula. The aromatic ring or rings present optionally may include substitution of at least some of the hydrogen atoms present thereon as discussed in connection with the first described moiety. Examples of monomers from which this moiety may be derived include p-aminophenol, p-N-methylaminophenol, p-phenylenediamine, N-methyl-p-phenylenediamine, N,N'-dimethyl-p-phenylenediamine, m-aminophenol, 3-methyl-4-aminophenol, 2-chloro-4-aminophenol, 4-amino-1-naphthol, 4-amino-4'-hydroxydiphenyl, 4-amino-4,-hydroxydiphenyl ether, 4-amino-4'-hydroxydiphenyl methane, 4-amino-4'-hydroxydiphenyl ethane, 4-amino-4'-hydroxydiphenyl sulfone, 4-amino-4'-hydroxydiphenyl sulfide, 4,4'-diaminophenyl sulfide (thiodianiline), 4,4'-diaminodiphenyl sulfone, 2,5-diaminotoluene, 4,4'-ethylenedianiline, 4,4'-diaminodiphenoxyethane, etc. Particularly preferred moieties may be derived from p-aminophenol.

Another possible monomer for selection when forming a polyester in accordance with the process of the present invention is one which imparts

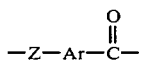

recurring moieties to the polymer chain where Ar comprises at least one aromatic ring and where Z is NH or NR where R is an alkyl group of 1 to 6 carbon atoms or an aryl group R is preferably a straight chain alkyl group of 1 to 6 carbon atoms and is more preferably a methyl group. Such monomer will impart amide linkages to the polymer chain. These monomers are inherently stoichiometrically balanced since they contain precisely the correct quantity of ester-forming or amide-forming reactant groups. In a preferred embodiment Ar is 1,4-phenylene. The polyester may include a plurality of different recurring moieties where Ar is different in each and where each satisfies the above general formula. The aromatic ring or rings present optionally may include substitution of at least some of the hydrogen atoms present thereon as discussed in connection with the first described moiety. Examples of monomers from which this moiety may be derived include p-aminobenzoic acid, p-N-methylaminobenzoic acid, m-aminobenzoic acid, 3-methyl-4-aminobenzoic acid, 2-chloro-4-aminobenzoic acid, 4-amino-1-naphthoic acid, 4-N-methylamino-1-naphthoic acid, 4-amino-4'-carboxydiphenyl, 4-amino-4'-carboxydiphenyl ether, 4-amino-4'-carboxydiphenyl sulfone, 4-amino-4'-carboxydiphenyl sulfide, p-aminocinnamic acid, etc. Particularly preferred moieties may be derived from p-aminobenzoic acid.

Any of the thermotropic liquid crystalline polyesters of the prior art may be formed in a thermally stable modified form in accordance with the improved process of the present invention such as those identified in the "Background of the Invention" section of the present disclosure. Highly satisfactory polyesters which may be produced in a modified form in accordance with the concept of the present invention are disclosed in commonly assigned U S. Pat. Nos. 4,161,470; 4,184,996; 4,219,461; 4,256,624; 4,330,457; and 4,351,917; and in commonly assigned U.S. patent application Ser. No. 485,820, filed Apr. 18, 1983 now U.S. Pat. No. 4,473,682. The thermotropic liquid crystalline polyesters of U.S. Pat. Nos. 4,330,457 and 4,351,917 additionally include amide linkages. It should be understood, however, that the concept of the present invention is not in any manner limited to such specific polymers, but instead is broadly applicable when employing a wide variety of ester-forming and amide-forming reactants as heretofore described.

In accordance with the concept of the present invention all ester-forming and amide-forming monomers are added to the polymerization zone in carefully measured quantities so that during the course of the polymerization there is provided a approximately 0.25 to 4 percent molar excess of aliphatic dicarboxylic acid monomer containing 4 to 12 carbon atoms and/or an esterified derivative thereof. In a preferred embodiment the aliphatic dicarboxylic acid is provided during the course of the polymerization reaction in a molar excess of approximately 0.5 to 4 percent. It is essential that this molar excess of aliphatic dicarboxylic acid monomer (and/or an esterified derivative thereof) be provided during the polymerization reaction in excess of the other monomer quantities which are sufficient to provide a stoichiometric balance between all carboxylic acid reactive groups (and/or an esterified derivative thereof) and the hydroxyl reactive groups (and/or an esterified derivative thereof) plus any amine reactive groups (and/or esterified derivative thereof).

The dicarboxylic acid selected is aliphatic in the sense that it contains no aromatic rings, and contains a total of 4 to 12 carbon atoms per molecule (e.g. preferably 8 to 10 carbon atoms per molecule). Representative aliphatic dicarboxylic acids which may be selected for use in the present process include succinic acid (butanedioic acid), glutaric acid (pentanedioic acid), adipic acid (hexanedioic acid), pimelic acid (heptanedioic acid), suberic acid (octanedioic acid), azelaic acid (nonanedioic acid), sebacic acid (decanedioic acid), undecanedioic acid, dodecanedioic acid, etc. A plurality of aliphatic dicarboxylic acids (and/or the esterified derivative thereof) optionally may be employed; however, in a preferred embodiment a single aliphatic dicarboxylic acid monomer is present. Those aliphatic dicarboxylic acids which impart dicarboxyaliphatic units to the polymer chain of relatively high thermal stability are preferred particularly when the resulting polymer is intended for an end use where it is subjected to a highly elevated temperature for an extended period of time. The particularly preferred aliphatic dicarboxylic acid monomer for use in the present process is azelaic acid and/or an esterified derivative thereof.

During the course of the polymerization reaction in accordance with the process of the present invention dicarboxyaliphatic units derived from such molar excess of aliphatic dicarboxylic acid monomer and/or an esterified derivative thereof are incorporated into the interior of the polymer chains of the resulting polymer and cause the polymer chains to terminate in carboxylic acid groups and/or an esterified derivative thereof. As the polymerization reaction progresses the other monomers present in the polymerization zone are fully depleted. The average polymer chain length achieved is directly controlled by the molar excess quantity of aliphatic dicarboxylic acid monomer and/or its esterified derivative provided in the polymerization zone during the course of the polymerization reaction. As the molar excess quantity of aliphatic dicarboxylic acid monomer and/or its esterified derivative increases within the range specified, the average polymer chain length decreases. As the molar excess quantity of aliphatic dicarboxylic acid monomer and/or its esterified derivative decreases within the range specified, the average polymer chain length increases. A polymer product of predetermined average chain length is produced by the process of the present invention through the selection of the specific molar excess utilized. Such average chain length may be conveniently evidenced by the inherent viscosity of the resulting polymer. In all instances the polymer chains of the resulting thermotropic liquid crystalline polyester terminate in carboxylic acid end groups and/or an esterified derivative thereof. Such product is thermally stable in the sense that it cannot undergo substantial additional polymerization with the concomitant evolution of condensation reaction by-products since the like end groups are substantially incapable of additional polymer chain growth upon subsequent heating.

The polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups (e.g. acyloxy groups), acid halides, etc. The organic monomer compounds may be reacted in the absence of a heat exchange fluid via a melt acidolysis procedure. They accordingly, may be heated initially to form a largely melt solution of the reactants wherein some reactants such as terephthalic acid initially are present to some degree as solids. Low levels of terephthalic acid may dissolve under such circumstances. The polymer product sometimes is suspended therein as solid polymer particles. A vacuum may be applied to facilitate removal of volatiles formed during the final stage of the condensation (e.g., acetic acid or water) and to otherwise expedite the polymerization.

In commonly assigned U.S. Pat. No. 4,067,852 of Gordon W. Calundann, entitled "Melt Processable Thermotropic Wholly Aromatic Polyester Containing Polyoxybenzoyl Units" is described a slurry polymerization process which may be employed to form the polyester of the present invention wherein the solid product is suspended in a heat exchange medium. The disclosure of this patent is herein incorporated by reference.

When employing either the melt acidolysis procedure or the slurry procedure of U.S. Pat. No. 4,067,852 the monomer reactants from which the polymer moieties are derived which would otherwise include a hydroxyl and/or an amine group preferably are preliminarily esterified. They preferably are provided as lower acyl esters of about 2 to about 4 carbon atoms. Preferably the acetate esters of such monomers which would otherwise include a hydroxyl group and/or an amine group are provided. Examples of such reactants are 6-acetoxy-2-naphthoic acid, 4-acetoxybenzoic acid, hydroquinone diacetate, 4,4'-biphenol diacetate, etc.

Alternatively any monomers which impart carboxyaryl and dicarboxyaliphatic units to the resulting polymer chain such as a aromatic dicarboxylic acid monomer and the aliphatic dicarboxylic acid monomer which is provided in molar excess may be provided initially in an esterified form. For instance, they may first be reacted with an aromatic monohydroxy compound such as phenol, m-cresol, p-cresol, etc. as described, for example, in U.S. Pat. No. 4,333,907. Examples of such reactants are phenyl p-hydroxybenzoate, diphenyl terephthalate, and diphenyl azelate. In a preferred embodiment the carboxylic acid groups of the reactants are non-esterified.

Representative catalysts which optionally may be employed in either the melt acidolysis procedure or in the procedure of U.S. Pat. No. 4,067,852 include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The polymerization procedures of commonly assigned U.S. Pat. Nos. 4,393,191; 4,421,908; and 4,429,105, also are suitable for use when carrying out the process of the present invention.

In a particularly preferred embodiment a polyester of commonly assigned U.S. Pat. No. 4,161,470 is produced in a modified form in accordance with the concept of the present invention. It has been found that in such embodiment wherein a process is carried out for the formation within a polymerization zone of a polyester which is capable of forming an anisotropic melt phase through a polymerization reaction of ester-forming monomers to form a polymer which consists essentially of moieties I and I wherein:

I is

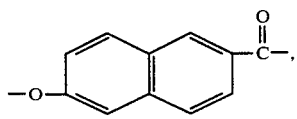

and

II is

wherein said polyester comprises approximately 10 to 90 mole percent (e.g. approximately 25 to 45 mole percent) of moiety I, and approximately 10 to 90 mole percent (e.g. approximately 55 to 75 mole percent) of moiety II; that improved results are achieved by providing in the polymerization zone during the polymerization reaction an approximately 0.25 to 4 percent molar excess of aliphatic dicarboxylic acid monomer containing 4 to 12 carbon atoms which during the polymerization reaction imparts dicarboxyaliphatic units to the interior of the polymer chains of the resulting polymer and causes the polymer chains to terminate in carboxylic acid end groups wherein the polymer chains achieve a predetermined average chain length through the depletion of other monomers present in the polymerization zone to yield a polyester product which is substantially incapable of additional chain growth upon subsequent heating.

In a further particularly preferred embodiment a polyester of commonly assigned U.S. Pat. No. 4,330,457 which includes amide linkages is produced in a modified form in accordance with the concept of the present invention. It has been found that in such embodiment wherein the process is carried out for the formation within a polymerization zone of a poly(ester-amide) which is capable of forming an anisotropic melt through a polymerization reaction of ester-forming and amide-forming reactants to form a polymer which consists essentially of moieties I, II, III, and optionally IV, wherein in each instance Ar is at least one aromatic ring, and wherein:

I is

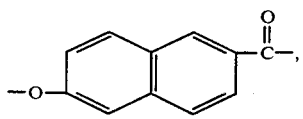

II is

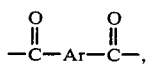

III is —Y—Ar—Z—, where Y is O, NH, or NR, and Z is NH or NR where R is an alkyl group of 1 to 6 carbon atoms or an aryl group, and IV is —O—Ar—O—, wherein said poly(ester-amide) comprises approximately 10 to 90 mole percent (e.g. approximately 40 to 80 mole percent) of moiety I, approximately 5 to 45 mole percent (e.g. approximately 5 to 30 mole percent) of moiety II, approximately 5 to 45 mole percent (e.g. approximately 5 to 30 mole percent) of moiety III, and approximately 0 to 40 mole percent (e.g. approximately 0 to 25 mole percent) of moiety IV; that improved results are achieved by providing in the polymerization zone during the polymerization reaction an approximately 0.25 to 4 percent molar excess of aliphatic dicarboxylic acid monomer containing 4 to 12 carbon atoms which during the polymerization reaction imparts dicarboxyaliphatic units to the interior of the polymer chains of the resulting polymer and causes the polymer chains to terminate in carboxylic acid end groups wherein the polymer chains achieve a predetermined average chain length through the depletion of other reactants present in the polymerization zone to yield a poly(ester-amide) product which is substantially incapable of additional chain growth upon subsequent heating. Here as throughout the specification there is no requirement that all Ar units present be chemically identical in any or all moieties.

The thermotropic liquid crystalline polyesters of the present invention commonly form an anisotropic melt at a temperature below approximately 400° C., and preferably at a temperature below 350° C.

The polymeric product of the present invention tends to be substantially insoluble at ambient temperature in all common polyester solvents, such as hexafluoroisopropanol and o-chlorophenol, and accordingly is not susceptible to solution processing. It can be readily processed by common melt processing techniques. Most compositions are soluble in pentafluorophenol to at least a slight degree.

The polyester of the present invention commonly exhibits a weight average molecular weight of about 4,000 to 50,000, and preferably about 4,000 to 30,000. Such molecular weight may be determined by standard gel permeation chromatography. For instance, in a typical test approximately 150 microliters of a 0.1 percent by weight polymer solution in a solvent consisting of a 1:1 mixture on a volume basis of pentafluorophenol and hexafluoroisopropanol are introduced into the gel permeation chromatography equipment consisting of a main control unit (e.g. Waters liquid chromatograph Model No. 201), four columns containing porous silica particles (e.g. DuPont SE4000, DuPont SE1000, DuPont SE100, and Waters 60 Angstrom Microporasil), and a laser light scattering unit (e.g. Chromatix KMX6) at ambient temperature. Typical melt processable anisotropic melt-forming polymers commonly show a retention time distribution in the range of 20 to 50 minutes.

The polyester additionally commonly exhibits an inherent viscosity (i.e., I.V.) of at least 0.6 dl./g. and preferably at least 0.8 dl./g. (e.g., approximately 0.8 to 10.0 dl./g. or more) when dissolved in a concentration of 0.1 percent by weight in pentafluorophenol at 60° C. In a particularly preferred embodiment the polyester of the present invention exhibits an inherent viscosity in the range of approximately 0.8 to 8.0 dl./g. when dissolved in a concentration of 0.1 percent by weight in pentafluorophenol at 60° C. Alternatively, the inherent viscosity of the polyester may be determined while dissolved in a 1:1 solution of pentafluorophenol/hexafluoroisopropanol in a concentration of 0.1 percent (W/V) at 25° C. This alternate technique offers the possibility of automation while operating at room temperature; however, it tends to yield numerical values which are higher than those obtained with a 0.1 percent solution in pentafluorophenol at 60° C. For instance, such values with the mixed solvent may be on the order of approximately 10 percent higher than those obtained with pentafluorophenol at 60° C.

The polyester of the present invention preferably also exhibits a melt viscosity in the range of approximately 10 to 10,000 poise (preferably approximately 20 to 3,000 poise) at 300° C. and a shear rate of 100 sec.$^{-1}$. Such melt viscosity may be determined by standard techniques using an Instron capillary rheometer having a capillary which measures 4 inches in length and has an inner diameter of 30 mils.

The polymeric product of the present invention is capable of withstanding vigorous melt devolatilization following its formation to eliminate entrained gaseous by-products from the preceding polymerization reaction. Suitable vigorous devolatilization processing conditions can, for instance, be carried out for 10 minutes or more at a temperature above the polymer melting temperature (e.g. at approximately 320° C. or above) while under a reduced pressure of approximately 1 Torr with vigorous agitation. The molecular weight of the polymer does not change to any substantial degree during such procedure nor does it change to any substantial degree during any subsequent melt processing step even if prolonged. The substantially complete removal of such gaseous by-product as well as the substantial non-generation of the same during subsequent melt processing facilitates the formation of quality molded articles in the substantial absence of deleterious voids caused by off-gassing. Accordingly, quality molded articles may be consistently formed from the product of the present invention on a reliable and readily reproducible basis.

The product of the present invention because of its thermal stability is particularly suited for the formation of molded articles on a reliable and readily reproducible basis. The product is capable of undergoing vigorous melt devolatilization.

The following example is presented as specific illustration of the claimed invention. It should be understood, however, that the invention is not limited to the specific details set forth in the example.

EXAMPLE

It was desired to produce a thermally stable polyester which is capable of forming an anisotropic melt phase, and has a predetermined average chain length which is evidenced by an inherent viscosity of approximately 3.8 dl./g. when dissolved in a concentration 0.1 percent by weight in pentafluorophenol at 60° C.

To a 300 ml. three-neck round bottom flask equipped with a sealed paddle stirrer, gas inlet tube, and distillation head connected to a condenser were added at room temperature (i.e. approximately 25° C.) the following:
(a) 31.08 grams of 6-acetoxy-2-naphthoic acid (0.135 mole),
(b) 65.76 grams of 4-acetoxybenzoic acid (0.365 mole),
(c) 0.941 gram of azelaic acid, and
(d) 0.006 gram of potassium acetate catalyst.

It can be calculated that a molar excess of 1.0 percent of azelaic acid monomer was provided in the reactor. More specifically, the 6-acetoxy-2-naphthoic acid and 4-acetoxybenzoic acid reactants where inherently stoichiometrically balanced since each provided the required carboxylic acid and acetoxy ester-forming reactant groups in an identical quantity. Accordingly, the azelaic acid monomer served as an aliphatic dicarboxylic acid monomer and provided the ester-forming carboxylic acid groups in a stoichiometric excess beyond the stoichiometric balance which existed with respect to the other monomers present.

The flask and its contents were throughly purged of oxygen by evacuating and refilling with dry argon, and were heated in a hot oil bath under a slow stream of argon.

The contents of the flask were initially heated to 240° C. over a period of 60 minutes, and to 340° C. over a period of another 100 minutes, and were maintained at 340° C. for 15 minutes while at substantially atmospheric pressure. Finally, the flask was evacuated to a pressure of approximately 0.3 mm. of Hg and heated at 340° C. under such reduced pressure conditions for another 60 minutes. The vacuum was then broken, and the resulting polymer recovered following cooling.

The chains of the resulting polymer included dicarboxyaliphatic units derived from azelaic acid at interior locations along the length of the polymer chains and terminated in carboxylic acid end groups. When the polymer is heated in either the melt or in the solid phase, no further polymerization or chain growth is observed.

The inherent viscosity (I.V.) of the polymer product is found to be approximately 4 dl./g. as determined in a pentafluorophenol solution of 0.1 percent by weight concentration at 60° C. in accordance with the equation:

$$I.V. = \frac{\ln(\eta rel)}{c},$$

where c=concentration of solution (0.1 percent by weight), and $\eta rel$=relative viscosity. The weight average molecular weight of the polymer product was approximately 20,000. When the polymer was subjected to differential scanning calorimetry (20° C./min. heating rate), it exhibited a melt endotherm peak at 279° C. The polymer melt was optically anisotropic and exhibited a melt viscosity of approximately 400 poise at 300° C. and at a shear rate of 100 sec.$^{-1}$.

Although the invention has been described with a preferred embodiment it is to be understood that variations and modifications may be employed without departing from the concept of the invention defined in the following claims.

I claim:
1. In a process for the formation within a polymerization zone of a polyester which is capable of forming an anisotropic melt phase and which optionally may include amide linkages through a polymerization reaction of ester-forming and optionally also amide-forming monomers to form a polymer having recurring moieties selected from the group consisting of the following where in each instance Ar comprises at least one aromatic ring:

(a)

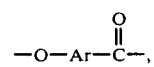

(b) —O—Ar—O—, (c)

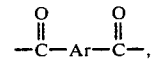

(d) —Y—Ar—Z—, where Y is O, NH, or NR, and Z is NH or NR where R is an alkyl group of 1 to 6 carbon atoms or an aryl group, (e)

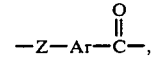

where Z is NH or NR where R is an alkyl group of 1 to 6 carbon atoms or an aryl group, and (f) fixtures of the foregoing;

the improvement of providing in the polymerization zone during said polymerization reaction an approximately 0.25 to 4 percent molar excess of aliphatic dicarboxylic acid monomer containing 4 to 12 carbon atoms and/or an esterified derivative thereof which during the polymerization reaction imparts dicarboxyaliphatic units to the interior of the polymer chains of the resulting polymer and causes the polymer chains to terminate in carboxylic acid end groups and/or an esterified derivative thereof wherein the polymer chains achieve a predetermined average chain length through the depletion of other monomers present in the polymerization zone to yield a polyester product which is substantially incapable of additional chain growth upon subsequent heating.

2. A process in accordance with claim 1 wherein said polymerization reaction is carried out in the melt.

3. A process in accordance with claim 1 wherein said polymerization reaction is carried out while the monomers are suspended as a slurry.

4. A process in accordance with claim 1 wherein any monomer present in the polymerization zone which would otherwise include a hydroxyl group and/or an amine group is provided as a lower acyl ester of about 2 to about 4 carbon atoms.

5. A process in accordance with claim 1 wherein any monomer present in the reaction zone which would otherwise include a hydroxyl group and/or an amine group is provided as an acetate ester.

6. A process in accordance with claim 1 wherein any monomer present in the reaction zone which yields carboxyaliphatic units in the polymer chains is provided in a non-esterified form and yields a product wherein the polymer chains terminate in carboxylic acid groups.

7. A process in accordance with claim 1 wherein the polyester product is wholly aromatic in the sense that each moiety present therein with the exception of moieties derived from the molar excess of aliphatic dicarboxylic acid contributes at least one aromatic ring.

8. A process in accordance with claim 1 wherein said aliphatic dicarboxylic acid monomer which is provided in a molar excess contains 8 to 10 carbon atoms per molecule.

9. A process in accordance with claim 1 wherein said aliphatic dicarboxylic acid monomer is azelaic acid.

10. A process in accordance with claim 1 wherein said aliphatic dicarboxylic acid monomer and/or an esterified derivative thereof is provided in the polymerization zone in a molar excess of approximately 0.5 to 4 percent.

11. A process in accordance with claim 1 wherein said polyester product exhibits an inherent viscosity of approximately 0.8 to 10.0 dl./g. when dissolved in a concentration of 0.1 percent by weight in pentafluorophenol at 60° C.

12. A process in accordance with claim 1 wherein said polyester product consists essentially of moieties I and II which optionally may include substitution of at least some of the hydrogen atoms present upon an aromatic ring wherein:
I is

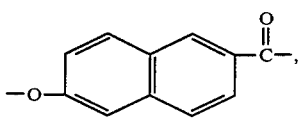

and
II is

with said optional substitution if present being selected from the group consisting of an alkyl group of 1 to 4 carbon atoms, an alkoxy of 1 to 4 carbon atoms halogen, phenyl, and mixtures of the foregoing, and wherein said polyester comprises approximately 10 to 90 mole percent of moiety I, and approximately 10 to 90 mole percent of moiety II, and which additionally incorporates an approximately 0.25 to 4 percent molar excess of units derived from an aliphatic dicarboxylic acid monomer containing 4 to 12 carbon atoms and/or an esterified derivative thereof.

13. A process in accordance with claim 1 wherein said polyester product consists essentially of moieties I, II, III, and optionally IV, which optionally may include substitution of at least some of the hydrogen atoms present upon an aromatic ring where in each instance Ar comprises at least one aromatic ring, and wherein:
I is

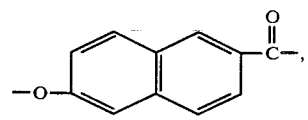

II is

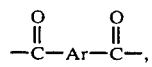

III is —Y—Ar—Z—, where Y is O, NH, or NR, and Z is NH or NR where R is an alkyl group of 1 to 6 carbon atoms or an aryl group, and IV is —O—Ar—O—, with said optional substitution if present being selected from the group consisting of an alkyl group of 1 to 4 carbon atoms, an alkoxy group of 1 to 4 carbon atoms, halogen, phenyl, and mixtures of the foregoing, and wherein said polyester comprises approximately 10 to 90 mole percent of moiety I, approximately 5 to 45 mole percent of moiety II, approximately 5 to 45 percent of moiety III, and approximately 0 to 40 mole percent of moiety IV, and which additionally incorporates an approximately 0.25 to 4 percent molar excess of units derived from an aliphatic dicarboxylic acid monomer containing 4 to 12 carbon atoms and/or an esterified derivative thereof.

14. A polyester formed in accordance with the process of claim 1 which is capable of forming an anisotropic melt phase, is substantially incapable of further chain growth upon heating, and which possesses polymer chains which terminate substantially exclusively in carboxylic acid end groups and/or an esterified derivative thereof.

15. In a process for the formation within a polymerization zone of a polyester which is capable of forming an anisotropic melt phase through a polymerization reaction of ester-forming monomers to form a polymer which consists essentially of moieties I and II wherein:
I is

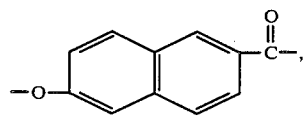

and
II is

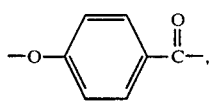

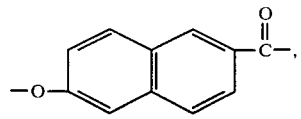

II is

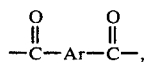

III is —Y—Ar—Z—, where Y is O, NH, or NR, and Z is NH or NR where R is an alkyl group of 1 to 6 carbon atoms or an aryl group, and IV is —O—Ar—O—, wherein said poly(ester-amide) comprises approximately 40 to 80 mole percent of moiety I, approximately 5 to 30 mole percent of moiety II, approximately 5 to 30 mole percent of moiety III, and approximately 0 to 25 mole percent of moiety IV; the improvement of providing in the polymerization zone during said polymerization reaction an approximately 0.25 to 4 percent molar excess of aliphatic dicarboxylic acid monomer containing 4 to 12 carbon atoms which during the polymerization reaction imparts dicarboxyaliphatic units to the interior of the polymer chains of the resulting polymer and causes the polymer chains to terminate in carboxylic acid end groups wherein the polymer chains achieve a predetermined average chain length through the depletion of other reactants present in the polymerization zone to yield a poly(ester-amide) product which is substantially incapable of additional chain growth upon subsequent heating.

24. A process in accordance with claim 23 wherein said polymerization reaction is carried out in the the melt.

25. A process in accordance with claim 23 wherein the oxy and amine portions of the monomers which form moieties I, III, and IV, are provided in said polymerization zone as lower acyl esters of about 2 to about 4 carbon atoms.

26. A process in accordance with claim 23 wherein the oxy and amine portions of the monomers which form moieties I, III, and IV, are provided in said polymerization zone as acetate esters.

27. A process in accordance with claim 23 wherein said aliphatic dicarboxylic acid monomer contains 8 to 10 carbon atoms per molecule.

28. A process in accordance with claim 23 wherein said aliphatic dicarboxylic acid monomer is azelaic acid.

29. A process in accordance with claim 23 wherein said aliphatic dicarboxylic acid monomer is provided in the polymerization zone in a molar excess of approximately 0.5 to 4 percent.

30. A process in accordance with claim 23 wherein said poly(ester-amide) product exhibits an inherent viscosity of approximately 0.8 to 10.0 dl./g. when dissolved in a concentration of 0.1 percent by weight in pentafluorophenol at 60° C.

* * * * * wherein said polyester comprises approximately 25 to 45 mole percent of moiety I, and approximately 55 to 75 mole percent of moiety II; the improvement of providing in the polymerization zone during said polymerization reaction an approximately 0.25 to 4 percent molar excess of aliphatic dicarboxylic acid monomer containing 4 to 12 carbon atoms which during the polymerization reaction imparts dicarboxyaliphatic units to the interior of the polymer chains of the resulting polymer and causes the polymer chains to terminate in carboxylic acid end groups wherein the polymer chains achieve a predetermined average chain length through the depletion of other monomers present in the polymerization zone to yield a polyester product which is substantially incapable of additional chain growth upon subsequent heating.

16. A process in accordance with claim 15 wherein said polymerization reaction is carried out in the melt.

17. A process in accordance with claim 15 wherein the oxy portions of the ester-forming monomers which form moieties I and II are provided in said polymerization zone as lower acyl esters of about 2 to about 4 carbon atoms.

18. A process in accordance with claim 15 wherein the oxy portions of the ester-forming monomers which form moieties I and II are provided in said polymerization zone as acetate esters.

19. A process in accordance with claim 15 wherein said aliphatic dicarboxylic acid monomer contains 8 to 10 carbon atoms per molecule.

20. A process in accordance with claim 15 wherein said aliphatic dicarboxylic acid monomer is azelaic acid.

21. A process in accordance with claim 15 wherein said aliphatic dicarboxylic acid monomer is provided in the polymerization zone in a molar excess of approximately 0.5 to 4 percent.

22. A process in accordance with claim 15 wherein said polyester product exhibits an inherent viscosity of approximately 0.8 to 10.0 dl./g. when dissolved in a concentration of 0.1 percent by weight in pentafluorophenol at 60° C.

23. In a process for the formation within a polymerization zone of a poly(ester-amide) which is capable of forming an anisotropic melt through a polymerization reaction of ester-forming and amide-forming reactants to form a polymer which consists essentially of moieties I, II, III, and optionally IV, wherein in each instance Ar is at least one aromatic ring, and wherein:

I is